(12) United States Patent
Pitteurs

(10) Patent No.: US 10,149,572 B2
(45) Date of Patent: Dec. 11, 2018

(54) WAFFLE IRON WITH IMPROVED CLEANABILITY

(71) Applicant: Benny Marcelinus Lydie Pitteurs, De Panne (BE)

(72) Inventor: Benny Marcelinus Lydie Pitteurs, De Panne (BE)

(*) Notice: Subject to any disclaimer, the term of this patent is extended or adjusted under 35 U.S.C. 154(b) by 75 days.

(21) Appl. No.: 15/032,988

(22) PCT Filed: Nov. 5, 2014

(86) PCT No.: PCT/BE2014/000061
§ 371 (c)(1),
(2) Date: Apr. 28, 2016

(87) PCT Pub. No.: WO2015/066775
PCT Pub. Date: May 14, 2015

(65) Prior Publication Data
US 2016/0278573 A1    Sep. 29, 2016

(30) Foreign Application Priority Data

Nov. 6, 2013  (BE) .................................. 2013/0756

(51) Int. Cl.
*A47J 37/06*    (2006.01)
(52) U.S. Cl.
CPC ................. *A47J 37/0611* (2013.01)
(58) Field of Classification Search
CPC .................................. A47J 37/0611
USPC ................. 99/372, 376, 378, 380, 389, 390
See application file for complete search history.

(56) References Cited

U.S. PATENT DOCUMENTS

| | | | | |
|---|---|---|---|---|
| 3,231,718 A | * | 1/1966 | Vasile | A47J 36/2483 156/224 |
| 4,102,256 A | * | 7/1978 | John | A47J 37/0611 219/525 |
| 6,257,126 B1 | * | 7/2001 | Veljkovic | A47J 37/0611 99/349 |
| 2010/0326979 A1 | * | 12/2010 | Kergoat | A47J 37/0611 219/450.1 |
| 2013/0156519 A1 | * | 6/2013 | Martinez Quintero | B23B 49/02 408/1 R |

FOREIGN PATENT DOCUMENTS

WO   WO-2013155574   10/2013

* cited by examiner

*Primary Examiner* — Dana Ross
*Assistant Examiner* — Joe E Mills, Jr.
(74) *Attorney, Agent, or Firm* — Marcus C. Dawes; Daniel L. Dawes

(57) ABSTRACT

Waffle iron comprising at least a baking mold, a heating element, a pressure body and a housing part; and tensioning means which act to clamp the heating element against the baking mold and which extend from the baking mold at most up to an inner wall of the housing part facing toward the pressure body.

14 Claims, 4 Drawing Sheets

WAFFLE IRON WITH IMPROVED CLEANABILITY

The present invention relates to a waffle iron comprising a baking mould, a heating element, a pressure body configured to clamp the heating element against the baking mould, and a housing part in which the pressure body and the heating element are received.

Waffle irons for baking various types of waffle or similar products which can be baked between two plates, such as Brussels waffles or Liege waffles, are generally known and typically comprise an upper and a lower baking mould between which the waffle is baked. Known waffle irons typically have a bolt or screw which is screwed from an outer wall of the housing part into threaded bushes mounted on the baking mould.

Known waffle irons have the drawback that, during for instance cleaning of the devices, protrusions and/or recesses are present in an outer wall of the housing part which make thorough cleaning thereof more difficult.

The present invention has for its object to propose a waffle iron which, owing to a new placing of tensioning means, achieves that the housing part has no protrusions and/or recesses on an outer surface of the housing part, so that thorough cleaning can take place.

An additional objective is to provide a waffle iron in which the baking mould can be removed in simple manner from the waffle iron for the purpose of cleaning, maintenance or repair, and in which the electrical parts can remain together during disassembly.

A first embodiment of a waffle iron according to the present invention comprises for this purpose a baking mould, a heating element, a pressure body with tensioning means configured to clamp the heating element against the baking mould, and a housing part for receiving the pressure body and the heating element. The baking mould has an outer surface which is accessible by a user and an inner surface adjacent to the heating element. The tensioning means are accessible at the outer surface of the baking mould and extend from the baking mould at least up to the pressure body and at most up to an inner wall of the housing part facing toward the pressure body.

Since the tensioning means are accessible on an outer surface of the baking mould, the user is able to lift the baking mould easily out of the waffle iron without having to handle the electronics or heating elements that are present. There are moreover no longer any protrusions on an outer wall of the housing part, so that the housing part can be thoroughly cleaned.

According to an embodiment, the baking mould is provided with at least one passage. The tensioning means can then preferably comprise at least one bolt which is preferably arranged centrally. The tensioning means can preferably also comprise at least one threaded bush into which the at least one bolt can be screwed in order to thus clamp the pressure body against the baking mould. Such an embodiment allows the pressure body to be tensioned in simple manner against the baking mould with interposing of the heating element, wherein the bolts can be tightened along the inner side of the waffle iron.

According to a preferred embodiment, the baking mould is provided with at least two passages. The tensioning means can then preferably comprise at least two bolts. The tensioning means can then preferably comprise at least two threaded bushes into which the at least two bolts can be screwed in order to thus clamp the pressure body against the baking mould. Providing at least two bolts enables better distribution of the pressure forces over the pressure body.

The above stated threaded bushes can be incorporated into the pressure body or mounted thereon, either on a side of the pressure body facing toward the housing part or on a side of the pressure body facing toward the baking mould, wherein in this latter case the form of the heating element is adapted so as to accommodate the threaded bushes.

Another possible embodiment achieves that the threaded bushes are incorporated in or mounted on the housing part on a side facing toward the pressure body.

According to a further developed embodiment, the tensioning means take the form of clamps which are incorporated into the pressure body and which run along an optional insulating layer and a heating element and which hook onto an edge of the baking mould provided for this purpose so that this latter is firmly clamped. In order to release these clamps (and so ensure that the user can easily remove the baking mould from the waffle iron), suitable auxiliary tools can be provided which can raise the hooking parts of the clamps from the edge of the baking mould.

According to a possible embodiment, the pressure body is provided with flange parts with openings. The housing part is likewise provided along a peripheral edge with corresponding openings. The housing part can in this way be fastened via screws to the flange parts of the pressure body. The skilled person will appreciate that bolts or other fastening mechanisms, such as spot welds, pop rivets and so on, can also be used instead of screws.

According to another possible embodiment, the housing part is fastened to the pressure body by means of screws which are screwed from a side of the pressure body facing toward the heating element, through provided passages and into threaded bushes provided on an inner wall of the housing part facing toward the pressure body.

The form of the waffle iron can then be round or angular, and can more generally take any random form.

The pressure body is preferably manufactured from metal and takes the form of a strengthened pressure plate so that sufficient tensioning force can be exerted. In order to make the assembly lighter but still sufficiently strong, one or more strengthening ribs can also be provided which can distribute the tensioning force over the whole pressure body.

According to a preferred embodiment of the waffle iron, the heating element is a winding plate around which an electrical resistance wire is wound in order to heat the baking mould through heat transfer via contact. In order to prevent the pressure plate and/or the housing part becoming too hot and so unsafe for a user, an insulating layer is preferably provided between the heating element and the pressure plate. The insulating layer is preferably manufactured from high-grade insulating material.

The invention will be further described on the basis of a number of by no means limitative exemplary embodiments of a waffle iron according to the present invention with reference to the accompanying drawings, in which.

Figure 1:
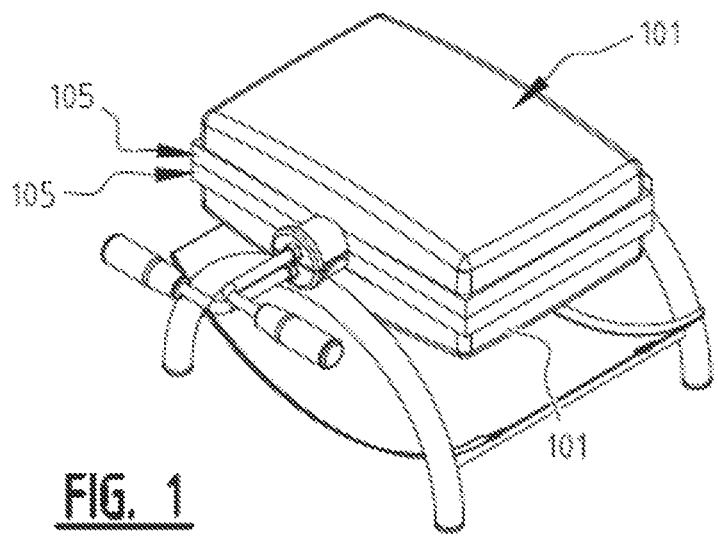
FIG. 1 is a perspective view of an embodiment of a closed waffle iron according to the invention.
Figure 2:
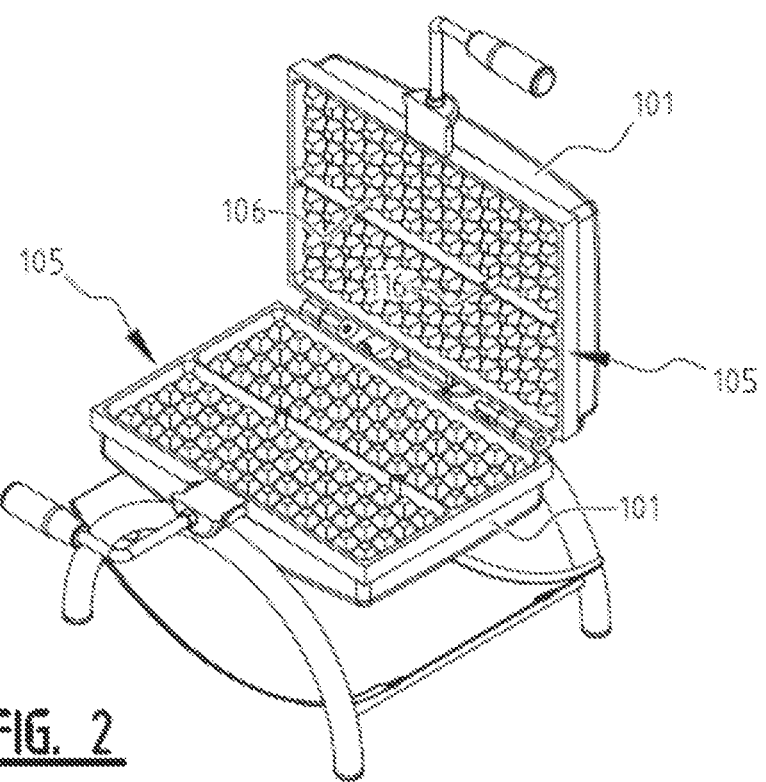
FIG. 2 is a perspective view of an embodiment of an opened waffle iron according to the invention.

FIGS. 1 and 2 illustrate schematically a first embodiment of a waffle iron according to the invention. The waffle iron comprises two baking moulds 105 and two housing parts 101. Visible in baking moulds 105 are the heads 116 of bolts 106 which have been screwed into baking moulds 105.

Figure 3:
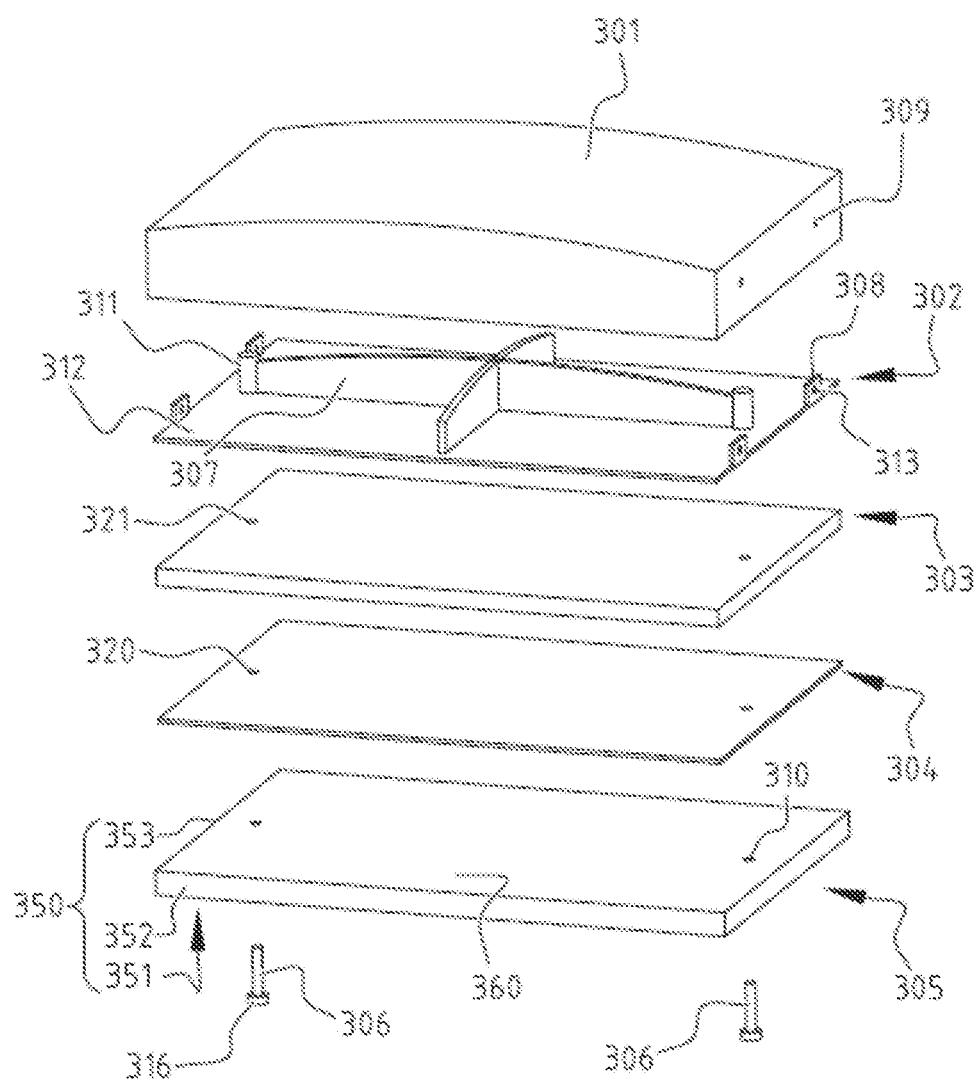
FIG. 3 is a cut-away perspective view of a second embodiment of an upper half of a waffle iron according to the invention.

FIG. 3 illustrates in detail a possible embodiment of an upper half of a waffle iron, for instance the waffle iron of FIGS. 1 and 2. In this embodiment the upper half comprises a baking mould 305, a heating element 304, an insulating layer 303, a pressure body 302 and a housing part 301. Baking mould 305 has an outer surface 350 which is accessible by a user and an inner surface 360 which, together with housing part 301, encloses heating element 304, insulating layer 303 and pressure body 302. Outer surface 350 is formed by a lower wall 351 on which a waffle can be baked, four side walls 352 and a peripheral edge 353 of the upper wall.

In this embodiment the tensioning means consist of a set of bolts 306 and threaded bushes 311. Two bolts 306 extend from the user-accessible outer surface 350 of baking mould 305 through two passages 310 arranged through baking mould 305 and through corresponding passages 320, 321 in heating element 304 and insulating layer 303. Each passage 310 has dimensions such that the head 316 of bolt 306 cannot pass therethrough. Arranged on pressure body 302 are two threaded bushes 311 into which bolts 306 can be screwed so as to thus exert sufficient clamping force so that pressure body 302, insulating body 303, heating element 304 and baking mould 305 can be firmly pressed together. These tensioning means thus allow baking mould 305 to be sufficiently tightened against pressure body 302 with heating element 304 and insulating layer 303 therebetween.

In an alternative embodiment a heating element 304 and an insulating layer 303 of smaller dimensions can be used, thereby obviating the necessity for passages 320-321.

In order to avoid making pressure body 302 too heavy, the pressure body is embodied as a pressure plate 312 with a pressure arch 307 which can absorb and distribute forces over the whole pressure plate 312.

The pressure body is provided with flange parts 308 with openings 313. Housing part 301 is provided along a peripheral edge with corresponding openings 309. The housing part can in this way be fastened via screws (not shown) to flange parts 308 of pressure body 302.

Figure 4:
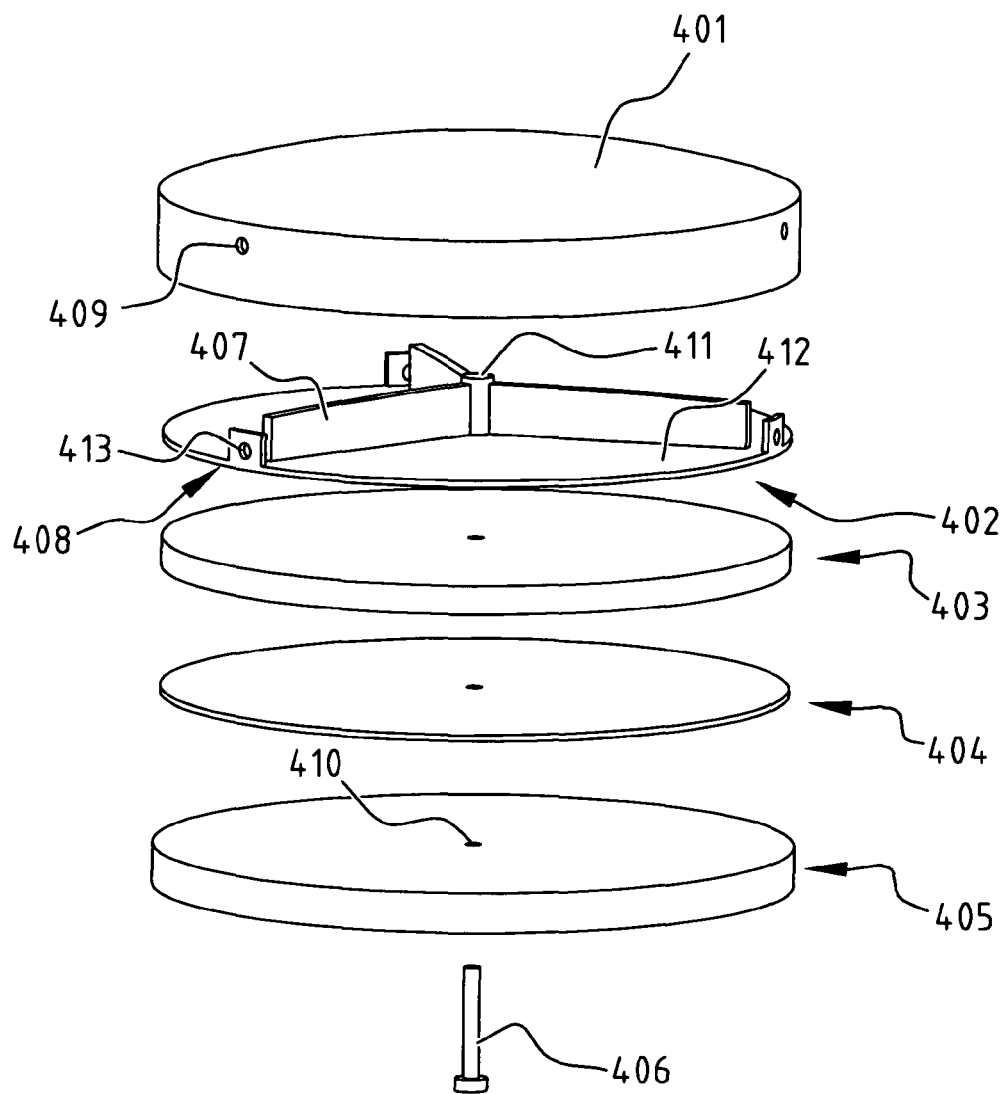
FIG. 4 is a cut-away perspective view of a third embodiment of an upper half of a waffle iron according to the invention.

FIG. 4 illustrates another possible embodiment of an upper half of a waffle iron. This embodiment is similar to the embodiment described in FIG. 3, with the difference that only one bolt 406 is provided instead of two bolts 306, and that a predominantly round shape has been chosen instead of a more angular shape as in FIG. 3. The tensioning means further comprise a threaded bush 411 into which bolt 406 can be screwed through a passage 410 in baking mould 405. Situated between baking mould 405 and pressure body 402 are a heating element 404 and an insulating layer 403. Pressure body 402 is embodied as a pressure plate 412 with several outward oriented strengthening ribs 407 for a better distribution over the whole pressure plate 412 of the tensioning forces developed on threaded bush 411. Several flange parts 408 with openings 413 are provided on the edge of pressure plate 412. Housing part 401 is provided along a peripheral edge with corresponding openings 409. The housing part can in this way be fastened via screws (not shown) to flange parts 408 of pressure body 402.

Figure 5:
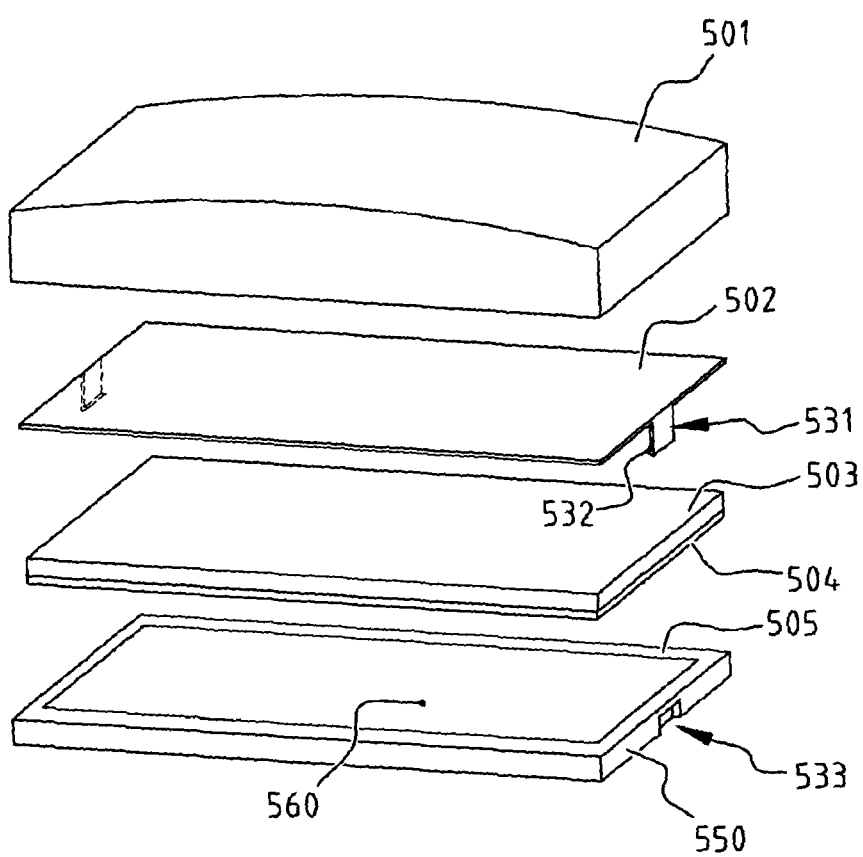
FIG. 5 is a cut-away perspective view of a fourth embodiment of an upper half of a waffle iron according to the invention.

FIG. 5 illustrates schematically another possible embodiment of an upper half of a waffle iron, for instance the waffle iron of FIGS. 1 and 2. In this embodiment the upper half comprises a baking mould 505, a heating element 504, an insulating layer 503, a pressure body 502 and a housing part 501. Baking mould 505 has an outer surface 550 accessible by a user and an inner surface 560 which, together with housing part 501, encloses heating element 504, insulating layer 503 and pressure body 502. Pressure body 502 is embodied as a relatively thick pressure plate.

The tensioning means comprise two clamps 531 which are mounted on or formed integrally with pressure body 502 and which can be clamped with protrusions 532 fixedly into two corresponding recesses 533 in outer surface 550 of baking mould 505, where they are accessible by the user.

In order to keep FIG. 5 simple a number of components are not shown, including the fastening means for fastening the housing part to the pressure body. The skilled person will appreciate that this can take place in different ways, for instance as described for FIGS. 3 and 4, but also for instance by providing threaded bushes on an inner wall of the housing part, wherein bolts extend through the pressure body into these threaded bushes.

Although the figures illustrate embodiments of the invention on the basis of a waffle iron, the skilled person will appreciate that the stated principles can be readily modified in order to apply the invention in a random baking device such as a pancake baking plate or a grilling apparatus. It is moreover pointed out that screws can equally well be used instead of the stated bolts, or vice versa.

The skilled person will appreciate that the present invention is not limited to the above described embodiments and that the scope of protection is defined solely by the following claims.

The invention claimed is:
1. A waffle iron comprising:
   a baking mould,
   a heating element,
   a pressure body with tensioning means configured to clamp the heating element against the baking mould, and
   a housing part in which the pressure body and the heating element are received, wherein the housing part and the baking mould are configured to enclose together the pressure body and the heating element;
   wherein the baking mould has an outer surface which is accessible by a user and an inner surface adjacent to the heating element, wherein the baking mould is provided with at least one passage extending from said inner surface to said outer surface;
   wherein the tensioning means comprise at least one bolt which extends through said at least one passage, the at least one bolt having at least one head which is accessible at the outer surface of the baking mould, said at least one bolt extending through the baking mould at least up to the pressure body and at most up to an inner wall of the housing part facing toward the pressure body; and
   wherein the pressure body comprises a pressure plate and at least one strengthening rib coupled to the pressure plate.
2. The waffle iron as claimed in claim 1, wherein the tensioning means comprise at least one threaded bush configured for co-action with the at least one bolt, this such that the pressure body is clamped against the baking mould with interposing of the heating element, wherein the at least one threaded bush is integrated into the pressure body or coupled to the pressure body.

3. The waffle iron as claimed in claim 1, wherein the at least one passage comprises a first passage and a second passage.

4. The waffle iron as claimed in claim 3, wherein the at least one bolt comprises at least a first and a second bolt which extend through the first and second passage.

5. The waffle iron as claimed in claim 4, wherein the tensioning means comprise a first and second threaded bush configured for co-action with the first and second bolt, this such that the pressure body is clamped against the baking mould with interposing of the heating element, wherein the first and second threaded bushes are integrated into the pressure body or coupled to the pressure body.

6. The waffle iron as claimed in claim 2, wherein the at least one threaded bush is provided against a side of the pressure body facing toward the housing part.

7. The waffle iron as claimed in claim 1, wherein the housing part has the form of a cap with a peripheral edge which extends along a peripheral edge of the pressure body, wherein the peripheral edge of the housing part is connected to the pressure body.

8. The waffle iron as claimed in claim 1, wherein an insulating layer is provided between the pressure body and the heating element.

9. The waffle iron as claimed in claim 1, wherein the pressure body is manufactured from metal.

10. The waffle iron as claimed in claim 1, wherein the heating element comprises an electrical resistance.

11. The waffle iron as claimed in claim 1, wherein the heating element comprises a winding plate around which an electrical resistance wire is wound.

12. The waffle iron as claimed in claim 1, wherein the insulating layer is manufactured from high-grade insulating material.

13. The waffle iron as claimed in claim 1, wherein the baking mould is manufactured from cast iron.

14. A waffle iron comprising:
a baking mould;
a heating element;
a pressure body with tensioning means configured to clamp the heating element against the baking mould; and
a housing part in which the pressure body and the heating element are received,
wherein the housing part and the baking mould are configured to enclose together the pressure body and the heating element,
wherein the baking mould has an outer surface which is accessible by a user and an inner surface adjacent to the heating element,
wherein the tensioning means are accessible at the outer surface of the baking mould and extend from the baking mould at least up to the pressure body and at most up to an inner wall of the housing part facing toward the pressure body,
wherein the housing part has the form of a cap with a peripheral edge which extends along a peripheral edge of the pressure body, wherein the peripheral edge of the housing part is connected to the pressure body,
wherein an insulating layer is provided between the pressure body and the heating element, and
wherein the pressure body comprises a pressure plate and at least one strengthening arch coupled to the pressure plate.

* * * * *